May 23, 1944.　　　F. W. GODSEY, JR　　　2,349,653
THRUST MEASURING DEVICE FOR SHAFTS
Filed Sept. 15, 1942
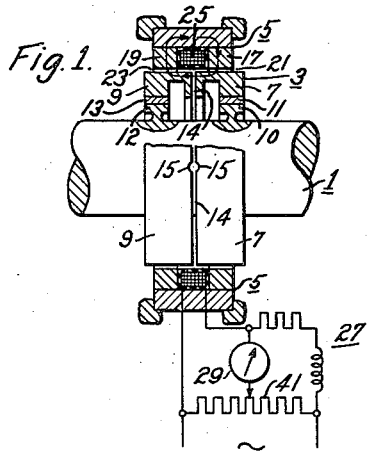
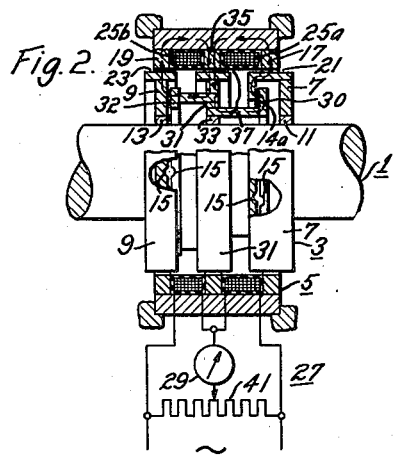
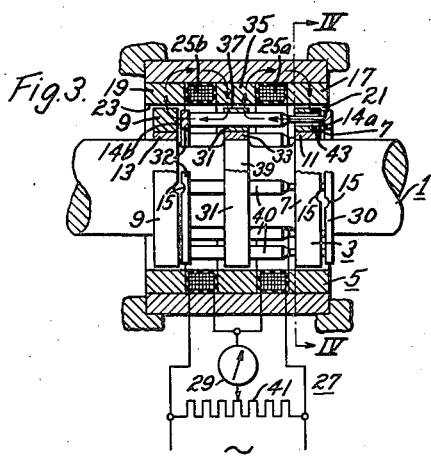
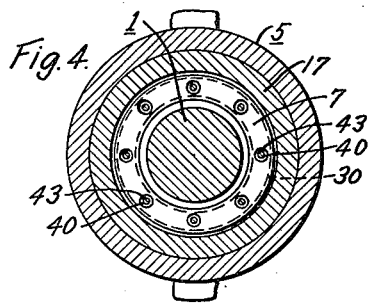
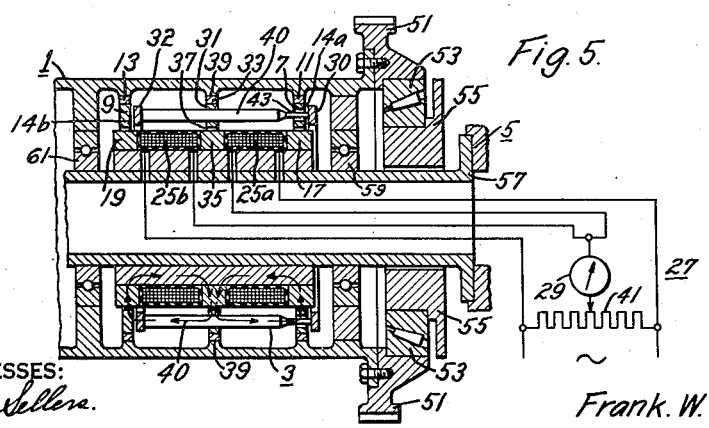
WITNESSES:
Wm. B. Sellers.
C. F. Oberheim
INVENTOR
Frank. W. Godsey, Jr.
BY
Paul E. Friedemann
ATTORNEY Patented May 23, 1944

2,349,653

UNITED STATES PATENT OFFICE 2,349,653

THRUST MEASURING DEVICE FOR SHAFTS

Frank W. Godsey, Jr., Forest Hills, Pa., assignor to Westinghouse Electric & Manufacturing Company, East Pittsburgh, Pa., a corporation of Pennsylvania Application September 15, 1942, Serial No. 458,379

9 Claims. (Cl. 265—1)

The present invention relates to thrust measuring devices, such as those operable in response to the axial deformation of a shaft.

More particularly, the present invention relates to a novel electromagnetic device operable in response to the thrust characteristics of a shaft.

The present invention is closely related to applicant's copending application Serial No. 455,258, filed August 18, 1942, entitled Power measuring device for rotating shafts, and the pending application of Bernard F. Langer and F. W. Godsey, Jr., Serial No. 458,378, filed September 15, 1942, entitled Torque measuring device for shafts.

In many cases, it is desirable to have a continuous indication of the thrust to which a shaft is being subjected. This may be for the purpose of avoiding dangerous loading of a shaft in either tension or compression or, as in the marine and aviation fields, for the purpose of determining the actual linear force being exerted or developed by the propeller, which is in a sense, for this specific application, a measure of the useful power developed. The present invention provides a thrust measuring device of inherently compact structure, and it is, therefore, particularly adaptable for use in measuring the thrust of propeller shafts in aircraft. Thrust indications for propeller shafts in aircraft may be desirable particularly in the multi-engine type, since the thrust exerted by the various propellers should be balanced. Otherwise, a turning movement is exerted about the center of gravity which must be corrected by the directional control. Present methods of synchronizing the various engines is a step towards this end. However, unequal aerodynamic characteristics among the several propellers will cause inequalities of thrust, though the engines are synchronized. Thrust measuring devices positioned on the various propeller shafts will indicate the pull or push exerted by each of the propellers, and should inequalities of thrust exist, the condition may be corrected by adjusting the propeller pitch, the engine speed or a combination of both until a uniform thrust is exerted by each of the propellers.

A principal object of the present invention is to provide a thrust measuring device that will respond to the thrust characteristic of a shaft and produce an electrical current or voltage indicative of the aforenamed characteristic.

Another object of the present invention is to provide a thrust measuring device that will eliminate the use of slip rings and brushes.

Another object of the present invention is to provide a thrust measuring device of such mechanical design as to be self-compensating for relative change of position of the component parts due to temperature, torque of the shaft, and bending of the shaft, the thrust of which is to be measured.

Another object of the present invention is to provide a thrust measuring device that will respond to the slight axial deformations available in small gauge lengths of shafts.

A further object of the present invention is to provide a thrust measuring device of compact construction that will be adaptable for use in relatively small spaces.

A still further object of the present invention is to provide a thrust measuring device of balanced construction that it may operate at high speeds without introducing vibrations into the given shaft or shaft system.

Other objects and advantages will become more apparent from a study of the following specification when considered in conjunction with the accompanying drawing, in which:

Figure 1 is a view, partially in section, of a thrust measuring device embodying the fundamental principles of this invention;

Fig. 2 is a view, partially in section, of a modification of this invention;

Fig. 3 is a view, partially in section, illustrating a further modification of this invention;

Fig. 4 is a sectional view taken on the line IV—IV of Fig. 3; and

Fig. 5 is a view in full section illustrating a reversed or inside-out construction of the invention illustrated in Fig. 3.

Broadly stated, the present invention is an electromagnetic device including stationary electrical coil means, the device being sensitive to the thrust characteristic of the given shaft in a manner to cause a voltage to appear in the electrical coil means indicative of the thrust in the shaft.

Referring now to the drawing, there is illustrated in Fig. 1 a thrust measuring device embodying the fundamental principles of this invention and the description relating to this Fig. 1, particularly as to its function, will apply generally to all the modifications shown, since there appears in all the figures a dual structure substantially of the character illustrated in Fig. 1, so that such undesirable effects as temperature, bending of the shaft and shaft torque may be automatically compensated for. The manner in which this is accomplished will be more fully described hereinafter.

Numeral 1 designates a shaft, the thrust of which is to be measured, numeral 3 indicates a rotor assembly, and numeral 5 indicates an annular stationary member which is concentrically positioned about the rotor assembly. The rotor assembly 3 comprises a pair of axially displaced rings 7 and 9. These rings are made of magnetic material and are secured to rotate with the shaft on bushings of non-magnetic material 11 and 13, so that a magnetic flux circulating therein will not include the shaft if the shaft is made of steel. In addition, the rings are spaced a predetermined distance apart so that inwardly formed flange portions thereof are axially spaced in close proximity and a known gauge length of shaft is included between the planes in which the rings are secured to the shaft. Oppositely disposed radial grooves 15 are provided in each of the confronting face portions of the rings 7 and 9 for the purpose of compensating for shaft shortening due to torque. It may be seen upon referring to Fig. 1 that axial deformation of the shaft, due either to tension or compression loading of the shaft, will correspondingly increase or decrease the air gap 14 formed between the confronting axial faces of the rings 7 and 9. Shortening of the shaft, due to torque or twisting, will also decrease the air gap 14, and it may, therefore, be seen that if such a condition were not corrected the air gap would be variable in response to torque as well as thrust. The expedient of providing the oppositely disposed radial grooves 15 in the confronting ring faces automatically compensates for air gap decreases due to torque, since as the shaft transmits torque circumferential deflection or twist of the shaft occurs, which relatively angularly displaces the rings so that a face portion of each of the confronting faces overhangs an edge of the opposite groove, thus decreasing the circular length of each confronting face, and as a result decreasing the confronting face area. Thus with decreasing of the air gap 14 due to torque, a proportional decrease in the confronting face areas forming the air gap 14 is obtained, thereby maintaining a substantially constant air gap characteristic, and as follows a substantially constant value of a magnetic flux circulation thereacross. Variations of the air gap 14, however, due alone to thrust, will vary the air gap characteristic in a degree proportional to the thrust, thereby changing the value of a magnetic flux circulating thereacross in a substantially proportional amount. As shown in the drawing, each ring element 7 and 9 of the rotor assembly is mounted on flanges 10 and 12 on the shaft. This is a desirable, though not absolutely necessary, provision since other methods of mounting the rings may be used. The method illustrated, however, largely isolates deformation of the shaft to the shaft portions on either side of the flanges due to the increased shaft strength in the plane of the flange. This condition obtains more or less whether the shaft is subject to torsional or axial deformation. The rings may, therefore, be securely seated on relatively large surfaces and be substantially free from the possibility of moving from their predetermined settings as a result of deflection of the surfaces on which they are secured.

The stationary member 5 is annular in shape and is concentrically positioned about the rotor assembly 3, so that each of the annular rings 17 and 19 forming the axial extremities of the stationary member has its inner periphery or bore positioned in close proximity to the peripheries of the axially spaced rings 7 and 9, thus forming two circular air gaps 21 and 23. A coil 25 is secured within the annular recess of the stationary member formed by the rings 17 and 19 and, for the purpose of illustrating one method of metering the voltage in the coil, is shown connected as one leg in a conventional impedance bridge circuit 27, the bridge circuit being supplied from a suitable source of alternating current and ordinarily adjusted to a balanced condition when the shaft is subject to zero thrust, so that a voltage will not appear across the terminals of an indicating meter 29 connected across the bridge.

Upon suitable energization of the coil 25, a flow of alternating magnetic flux is induced in the stationary member 5 and the rotor assembly 3, which is indicated as circulating in a clockwise direction by the arrows. Specifically, the magnetic circuit includes the stationary member 5, air gap 21, the right axially spaced ring 7, air gap 14, the left axially spaced ring 9, air gap 23 and back to the stationary member 5. The air gaps 21 and 23 are so adjusted that the magnetic reluctance across the air gaps 21 and 23 is small compared to that across the air gap 14. It may now, therefore, be seen that, whether rotating or stationary, if the shaft is not subject to thrust, the circulating magnetic flux will maintain a substantially constant value and the voltage in the coil 25 will maintain a correspondingly constant value. If, however, there is axial deformation of the shaft due to thrust, the air gap 14 will proportionally increase or decrease depending upon the direction of the deformation to proportionally change the value of the circulating magnetic flux. Changes in the value of the circulating magnetic flux correspondingly change the value of the voltage in the coil 25, thereby unbalancing the bridge circuit of which it forms one leg and causing a voltage to appear across the terminals of the indicating meter 29 indicative of the axial deformation or shortening of the shaft.

From the foregoing disclosure, it may now be seen that a novel form of magnetic strain gauge is provided in which the stationary member comprises the coil and core assembly and the rotor assembly comprises the armature. The structure disclosed, however, has the distinct advantage of eliminating the necessity for slip rings and brushes for supplying the current to the coil as is the case with the conventional magnetic strain gauge in which both the coil and core assembly and armature usually rotate with the shaft. Fig. 1 serves to illustrate the fundamental principles of the invention which is essentially a magnetic strain gauge in which the electrical energy is transmitted to the rotating parts through magnetic air gaps instead of through the electrical contact between slip rings and brushes.

As previously mentioned, the characteristic appearing in all the figures following Fig. 1 is the dual structure of the modification illustrated in Fig. 1. In these figures, parts similar to those in Fig. 1 will be given like reference numerals.

Referring now to Fig. 2, reference numerals 1, 3 and 5 again respectively indicate the shaft, the rotor assembly and the stationary member. Axially displaced rings 7 and 9 no longer have portions of each thereof positioned in close proximity, but are entirely separated and each has axially positioned in close proximity a ring 30 for the axially displaced ring 7 and a ring 32 for the axially displaced ring 9. The rings 30 and 32 are supported and secured to rotate with the shaft by a ring 31 which is secured to the shaft centrally between rings 7 and 9 on a bushing 33 of non-magnetic material. The rings 30 and 32 are hereinafter termed reference rings. The positioning of the parts is such that, for example, if the shaft were loaded in compression, the air gap 14a formed between the confronting faces of the ring 7 and the reference ring 30 would be increased, and the air gap 14b formed between the confronting faces of the ring 9 and the reference ring 32 would be decreased. Loading of the shaft in tension will, of course, reverse the effect on the air gaps, thus increasing air gap 14b while decreasing air gap 14a.

Stationary member 5 comprises the rings 17 and 19 corresponding to the rings 17 and 19 of Fig. 1, and in like manner their inner peripheries or bores are positioned in close proximity to the peripheries of the axially displaced rings 7 and 9, thus forming circular air gaps 21 and 23. A third ring 35 is disposed centrally of rings 17 and 19 and has its inner periphery or bore positioned in close proximity to the periphery of the centrally positioned ring 31 of the rotor assembly forming a further circular air gap 37. Annular coils 25a and 25b are positioned in the recesses formed in the stationary member between the rings 17, 19 and 35. Each of the coils 25a and 25b is connected as one leg in a conventional bridge circuit. Upon suitable energization of the coils, a magnetic flux linked with each coil may be induced to flow in the stationary member and rotor assembly in the directions indicated by the arrows, and the impedance bridge may be balanced for zero thrust of the shaft by the potentiometer slider on the potentiometer 41, each half of which forms one leg of the bridge circuit. The magnetic reluctances appearing across the air gaps 21 and 23 and 37 associated with coils 25a and 25b are preferably made small compared to those appearing across the variable air gaps 14a and 14b.

Assuming now that thrust is being transmitted which loads the shaft in compression, it will be seen that upon shortening of the shaft gauge lengths included between the rings 7, 9 and 31, the air gap 14b formed between the confronting faces of the axially spaced ring 9 and the reference ring 32 will be decreased, while the air gap 14a formed between the confronting faces of the axially spaced ring 7 and the reference ring 30 will be increased, thus unbalancing the normal circulating magnetic flux associated with each coil to correspondingly increase the voltage in one coil while decreasing the voltage in the other coil, thus unbalancing the bridge circuit of which each coil forms one leg and causing a voltage to appear across the terminals of the indicating meter 29 connected across the bridge to measure unbalance therein. The voltage unbalance or difference between the coils is indicative of the axial deformation or thrust of the shaft.

In this embodiment of the present invention, torque is compensated for in a manner similar to that described in connection with Fig. 1. Oppositely disposed radial grooves 15 are provided in the confronting faces of the axial displaced ring 9 and the reference ring 32, which grooves function, as previously described, to decrease the confronting face areas with decreasing axial spacing when the rings are relatively angularly displaced due to torque in the shaft. The radial grooves 15 provided in the confronting faces of the axial spaced ring 7 and the reference ring 30 are angularly displaced from each other and are positioned to vary the confronting face areas in a manner to compensate for torque transmission from left to right of the shaft in a clockwise direction. The resulting torsional deflection will shorten the gauge length of the shaft included between the axially displaced ring 7 and the central support 31 of the reference ring 30, thus increasing the air gap 14a. At the same time, however, this same torsional deflection will so angularly displace the rings 7 and 30 that the grooves 15 in each of the confronting faces will be moved towards an oppositely disposed position in a manner to increase the confronting face areas. Thus with increases of the air gap 14a due to torque, the confronting face area of the air gap is also increased to maintain a substantially constant air gap characteristic, and as a result the value of a magnetic flux circulating across the air gap will remain substantially unchanged. If the torque being transmitted is reversed from that described, the positioning of the grooves must be reversed, that is, the groove 15 in the reference ring will be positioned above the groove 15 in the torque ring as viewed in the drawing. Otherwise, the confronting face area would be decreased as the air gap increased to further increase the error introduced by shaft shortening due to torque. Temperature effects may be compensated for by providing material in the supporting structure for the reference rings having the same coefficient of expansion as the shaft, so that increases of shaft length due to temperature rise will in a substantially like amount increase the axial length of the supporting structure for the reference rings. Thus, with increasing or decreasing temperatures, the axially displaced rings and their cooperating reference ring will be moved in a like amount so that the characteristics of the magnetic air gaps 14a and 14b will remain effectively unchanged. Bending of the shaft will tilt an axially spaced ring relative to a reference ring. However, this tilting will take place about an axis intersecting the shaft centerline, in which case while the confronting face portions on one side of the shaft are moving together the diametrically opposite face portions are moving apart, thus maintaining the overall or total reluctance across the air gap effectively unchanged. Relative axial displacement of either the rotor assembly 3 or the stationary member 5 is compensated for by providing a large axial face length in opposition to a small axial face length on the parts forming the air gaps 21, 23 and 37.

It may be seen from Fig. 2 that upon passing a plane transversely of the structure centrally thereof two structures are obtained essentially of the same character, as illustrated in Fig. 1, the only difference being that in one of the structures thus formed the variable air gap will increase with compression of the shaft, while in the other the variable air gap will decrease.

The function of the embodiment of the invention illustrated in Fig. 3 is essentially the same as that described for Fig. 2. Torque, temperature, bending of the shaft and relative axial shift of either the stationary member or rotor assembly are all compensated for in a manner identical with that of Fig. 2. The main differences reside in the construction of the device. In addition, an alternative and equally desirable form of magnetic circuit is utilized. The shaft 1, in this instance, is provided with two reduced diameter sections of predetermined axial length. The annular shaft recesses thus formed are axially spaced from each other a sufficient distance to provide a small flange 39 therebetween. The axially spaced rings 7 and 9 are secured to the outer recess extremities, while the central ring 31 is secured to the flange 39. The three rings, as previously described in connection with the other figures, are magnetically insulated from the shaft on bushings of non-magnetic material 11, 13 and 33. The reference rings 30 and 32 are supported upon bars or rods 40 positioned and supported axially of the shaft by the centrally disposed ring 31. These bars are reduced in diameter on their right ends and extend concentrically through the holes 43 (see both Figs. 3 and 4) provided in the axially spaced ring 7 to support the reference ring 30 on the opposite side. The holes must be sufficiently large that the magnetic flux will not circulate from ring 7 to the rods 40. This assembly provides the same response to tension and compression of the shaft as the assembly in Fig. 2. The rods 40 also have a coefficient of expansion similar to that of the shaft, so that temperature variations will not effectively change the air gaps 14a and 14b. The provision of the annular recesses in the shaft serves to largely restrict shaft deformation to the gauge length or shaft length between the several rings, thus accurately maintaining the predetermined gauge length, and, therefore, permits the mounting of the several rings on fairly large surfaces without the danger of their being displaced from their predetermined settings due to deflections of the shaft surface on which they are secured.

In this modification of the present invention, the coils are energized to induce a flow of alternating magnetic flux in the magnetic circuit of such direction that the alternating magnetic flux associated with each of the coils 25a and 25b will oppose in the central ring 35, as indicated by the arrows. The alternating magnetic flux thus induced will be so adjusted by adjusting the voltages of the coils that for zero thrust the total flux in the central ring 35 will be approximately zero. Thus, when the shaft is subject to thrust, the alternating magnetic fluxes will be unbalanced by reason of the variations in the air gaps 14a and 14b, and an unbalanced magnetic flux appears across the air gap 37 and flows through the ring 35 and follows the magnetic circuit in which the reluctance is the least. The alternating magnetic fluxes associated with each of said coils are, therefore, unbalanced and induce a corresponding unbalance or difference in the voltages across the coils which is indicated by the indicating meter 29 across the bridge circuit 27 of which each coil 25a and 25b forms one leg. The magnetic circuit described in this paragraph forms, in effect, a magnetic bridge which is normally balanced when the shaft is not subject to thrust, but which is unbalanced in response to axial deformation due to thrust.

In many cases of shaft installations, space limitations are such that it is impossible to attach a thrust measuring device about the shaft. In installations of this type where a hollow shaft may be utilized having one end thereof accessible, a reversed or inside-out modification of the structure illustrated in Fig. 3 may be used. This adaptation of the invention is illustrated in Fig. 5. A hollow shaft 1 may be supplied with power through a spur gear 51. The shaft installation is shown supported on its right end on a bearing race 53 seated on a housing 55, a fragmentary portion of which is shown. The rotor assembly 3 is positioned internally of the shaft, the axially spaced rings and reference rings being disposed as previously described. The stationary member 5 comprises a tubular support 57, the rings 17, 19 and 35 and the circular coils 25a and 25b positioned in the annular recesses formed between the rings. The coil leads are brought out through the tubular member, and the coils are connected each as one leg in this conventional bridge circuit. Concentric positioning and axial locking of the stationary member relative to the rotor assembly are accomplished by means of the bearing supports 59 and 61, and the stationary member is stationarily secured to the housing 55 or other convenient stationary support.

From the foregoing, it is obvious that applicant with his novel form of thrust measuring device has provided means for continuously measuring the thrust to which a shaft is being subjected, whether the shaft is rotating or stationary. The inventive electromagnetic device, or, more specifically, magnetic strain gauge, operable in response to slight axial deformations of the shaft and serving as the shaft pickup element, provides means for continuously indicating the thrust of a shaft in a degree of accuracy previously unobtainable. Furthermore, it will be seen upon inspection of the various illustrations in the drawing that the thrust measuring device will operate satisfactorily at high speeds of rotation by reason of its balanced construction. By utilizing magnetic air gaps for transmitting electrical energy to the rotating parts and providing all electrical windings on the stationary member, the necessity for slip rings and brushes with their error-introducing electrical characteristics is eliminated.

The foregoing disclosure and the showings made in the drawing are merely illustrative of the principles of this invention and are not to be interpreted in a limiting sense. The only limitations are to be determined from the scope of the appended claims.

I claim as my invention:

1. Apparatus for continuously indicating the thrust of a shaft comprising, in combination, stationary electrical coil means, a magnetic flux path, means for producing a magnetic flux in said magnetic flux path linked with said stationary electrical coil means, means responsive to the axial deformation of said shaft for altering the value of said magnetic flux thereby changing the value of a voltage in said stationary electrical coil means in an amount indicative of the axial deformation of said shaft.

2. Apparatus for continuously indicating the thrust of a shaft comprising, in combination, a rotor assembly secured to said shaft, a stationary member, coil means secured to said stationary member, a source of alternating current for energizing said coil means, said coil means being adapted to induce a flow of magnetic flux in said stationary member and said rotor assembly, means included in said rotor assembly responsive to the axial deformation of said shaft for altering the value of said magnetic flux thereby alternating the value of a voltage in said electrical coil means in an amount indicative of the thrust of said shaft.

3. Apparatus for continuously measuring the thrust of a shaft comprising, in combination, a rotor assembly secured to said shaft, a stationary member, coil means secured to said stationary member, a source of alternating current for energizing said coil means, said coil means being adapted to induce a circulating alternating magnetic flux in said stationary member and said rotor assembly, said rotor assembly comprising at least two members axially displaced and secured to said shaft such that at least one air gap is formed therebetween, variable in response to axial deformation of said shaft due to thrust, variations in said air gap change the value of said magnetic flux thereby changing the value of a voltage in said coil means, and means for measuring the voltage whereby the thrust of said shaft is indicated.

4. Apparatus for continuously indicating the thrust of a shaft comprising, in combination, a plurality of stationary coils, a source of alternating current for energizing said coils such that voltages in said coils are equal when said shaft is not subject to thrust, relatively axially displaceable means responsive to the axial deformations of said shaft due to thrust for unbalancing the voltages in said coils in proportion to said axial deformation thereby causing a voltage difference to appear between the voltages indicative of the thrust of said shaft.

5. Apparatus for continuously measuring the thrust of a shaft comprising, in combination, a rotor assembly secured to rotate with said shaft, a stationary member, at least two coils secured to said stationary member, a source of alternating current for energizing said coils, said coils being adapted upon energization thereof to induce a flow of magnetic flux in said stationary member and said rotor assembly such that each coil has a circulating magnetic flux linked therewith, said coils having voltages of equal value therein when said shaft is not subject to thrust, means included in said rotor assembly responsive to axial deformation of said shaft due to thrust for changing the value of each magnetic flux linked with each of said coils such that a voltage difference appears between said coils, and a meter for measuring said voltage difference whereby the torque of said shaft is indicated.

6. Apparatus for continuously indicating the thrust of a shaft comprising, in combination, a rotor assembly secured to rotate with said shaft, a stationary member, at least two coils secured to said stationary member, a source of alternating current for energizing said coils, said coils being adapted to induce a flow of magnetic flux in said stationary member and said rotor assembly such that each coil has a circulating magnetic flux linked therewith, said coils having voltages therein of equal value when said shaft is not subject to thrust, said rotor assembly comprising a pair of axially spaced rings secured to said shaft and a pair of reference rings axially interconnected by a support which is secured to said shaft intermediate said axially spaced rings, said reference rings being positioned so that each axially spaced ring has a reference ring axially spaced therefrom in close proximity thereto such that at least one air gap is formed between the confronting axial faces of said axially spaced rings and said reference rings, the assembly being such that axial deformation of said shaft due to thrust increases the air gap formed by one of said axially spaced rings while decreasing that formed by the other, thus increasing the value of a magnetic flux linked with one of said coils while decreasing the magnetic flux linked with the other, thereby causing a voltage difference to appear between said coils, and means for measuring the voltage difference whereby the thrust of said shaft is measured.

7. Apparatus of the character referred to in claim 6 in which said rings positioned in close proximity are provided with radial slots in their confronting faces so positioned that angular displacement of one ring relative to the other due to torque will correspondingly vary the confronting face area such that shortening of said shaft due to torque and the corresponding decreasing of one air gap and increasing of the other will be automatically compensated for by suitable variation in the confronting face area.

8. Apparatus of the character referred to in claim 6 in which said support comprises a plurality of axially extending rods interconnecting said reference rings.

9. Apparatus of the character referred to in claim 6 in which said support comprises an annular ring connected to each of said reference rings.

FRANK W. GODSEY, JR.